Nov. 8, 1960 L. W. MARSH, JR., ET AL 2,959,734

ELECTRONIC TIMING SYSTEM

Filed Jan. 23, 1956 3 Sheets-Sheet 1

Inventors
Lynn W. Marsh Jr
Leo Rosen
by James R. Hodder
Attorney

Inventors
Lynn W. Marsh Jr.
Leo Rosen
by James R. Hodder Attorney

Inventors
Lynn W. Marsh Jr
Leo Rosen
by James R. Hodder
Attorney 2,959,734

ELECTRONIC TIMING SYSTEM

Lynn W. Marsh, Jr., Baltimore, Md., and Leo Rosen, Framingham, Mass., assignors, by mesne assignments, to Anelex Corporation, Concord, N.H., a corporation of New Hampshire Filed Jan. 23, 1956, Ser. No. 560,769

14 Claims. (Cl. 324—68)

This invention relates to electronic signal observation systems, and relates more particularly to electronic time-interval measuring and counting systems, and to circuits used in such systems.

A feature of this invention is that a plurality of phototubes are so arranged that the sweep of a cathode ray tube traverses each phototube in succession. One sweep is accomplished for each unit of time. Intensification of the cathode ray tube beam caused by incoming signals causes temporary storage in the cathode ray tube as a function of the phosphor decay-time characteristic. Phototubes, opposite the brightened spots of the sweep, control circuits which provide accurate measurements of time intervals by allowing for discrimination between high speed counts to be effected at a much lower speed.

Another feature of this invention is that the incoming signals provide, through a delay circuit, voltage pulses which, applied in coincidence with voltage pulses from respective phototubes, provide relatively low speed output signals, the delay circuit allowing time for proper phototube response.

An object of this invention is to provide means for storing a count sampled at relatively high speed, and for recording the count at relatively low speed.

Another object of this invention is to provide means for counting that is capable of extending the frequency of counting without altering the basic counter.

Another object of this invention is to allow multiple samplings to be made in a regular or irregular succession under control of an external signal source.

Another object of this invention is to provide accurate measurement of time intervals by allowing for discrimination between high speed counts to be effected at relatively low speeds.

A principal object of this invention is to provide a continuously running counter assembly which is sampled at appropriate times to allow measurement and recording of successive time intervals.

Other objects of this invention will be apparent from the following description.

The invention will now be described with reference to the annexed drawings, of which:

Figure 1:
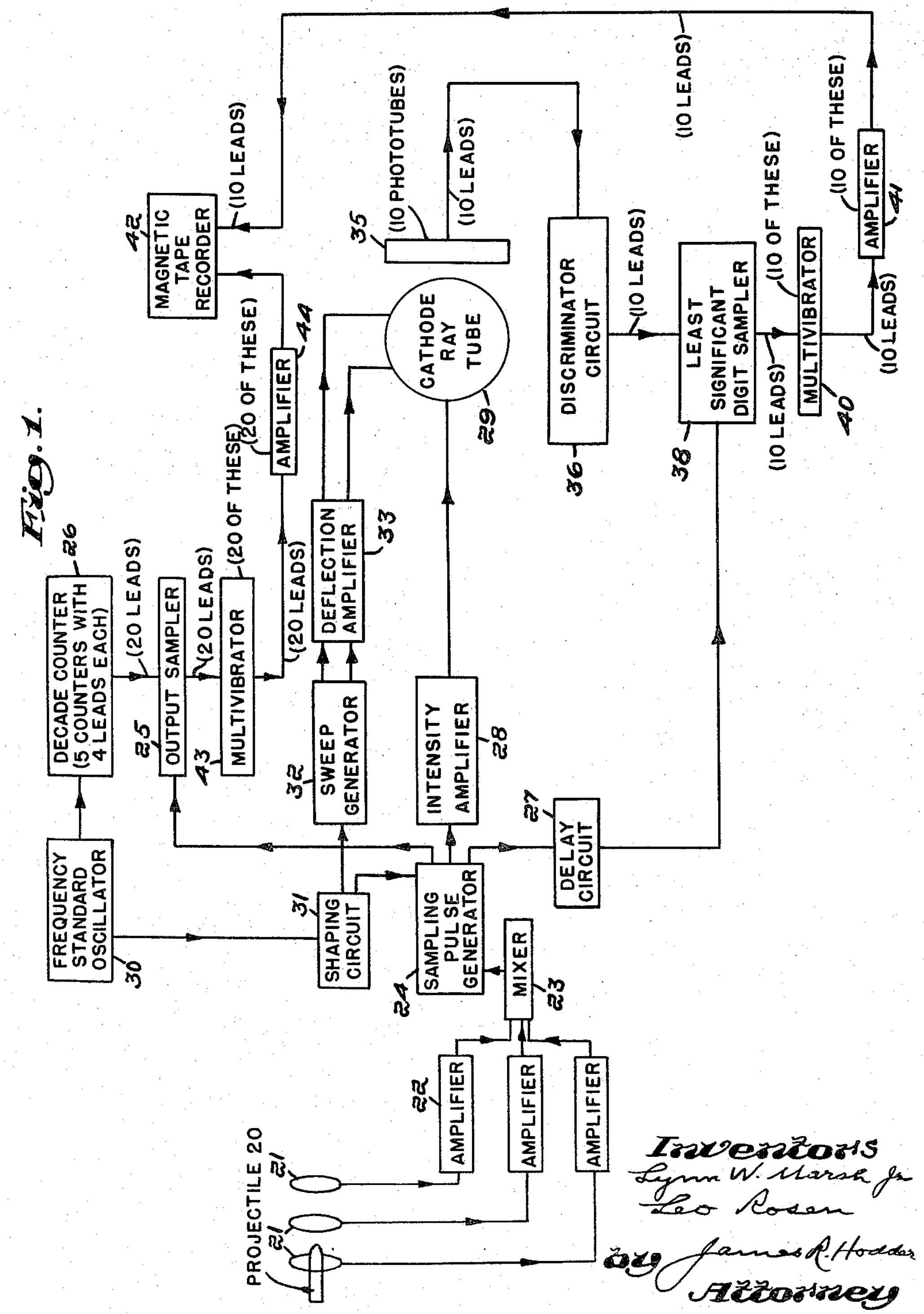
Fig. 1 is a block diagram of a time-interval measuring and counting system embodying this invention.

The system shown by Fig. 1 is one designed to measure the speed of moving objects such as a projectile 20 which passes in succession through three equally spaced loops 21. The loops are connected to amplifiers 22, the outputs of which are connected to a mixer 23, the output of which is connected to the input of a Sampling Pulse Generator 24 which has three outputs, two delivering spiked pulses to an Output Sampler 25 of a conventional Decade Counter 26, and to a conventional Delay Circuit 27, the third delivering a square wave pulse to an Intensity Amplifier 28, the output of which is connected to the cathode beam circuit of a cathode ray tube 29.

A conventional Frequency Standard 30 is connected to the Decade Counter 26, and to a conventional Pulse Shaping Circuit 31, the output of which is connected to the Sampling Pulse Generator 24 and to a conventional Sweep Generator 32 which is connected to a Deflection Amplifier 33 for the tube 29.

A series of phototubes 35 are spaced across the sweep of the cathode ray tube 29 so as to be exposed in succession to the light from the Screen caused by the beam, which light is nor normally bright enough to activate the phototubes and their following circuits. The beam of the cathode ray tube will be intensified for activating the phototubes by input signals as will be described in the following.

The sweep generator 32 consists of a linear charging circuit arranged to deflect the cathode ray tube beam horizontally at a uniform rate and to restore it to zero position upon receipt of the signal from the frequency standard. The Shaping Circuit 31 derives the pulse by means of which the sweep is returned to zero position. The Decade Counter 26 is advanced one count at a time intermediate between pulses from the Shaping Circuit 31. When the equipment is turned on the cathode ray tube is sweeping continuously.

Usual practice in measuring time intervals using decade counters requires that the counters be started, read and returned to zero position in preparation for the next reading. The counter assembly of the present invention preferably runs continuously and is sampled at appropriate times to allow recording of consecutive time intervals. Thus, the Frequency Standard 30 drives the Decade Counter 26 and the Sweep Generator 33 continuously.

The output of the Sampling Pulse Generator 24 is a succession of pulses of equal duration, each pulse duration being less than one cycle of the standard frequency, and suitable for intensifying the beam of the tube 29 through amplification by the Intensity Amplifier 28, and for initiating action of the Delay Circuit 27. When a sampling is made, the cathode ray tube beam is intensified sufficiently to produce enough light to generate a corresponding signal in one or more of the phototubes 35.

Figure 4:
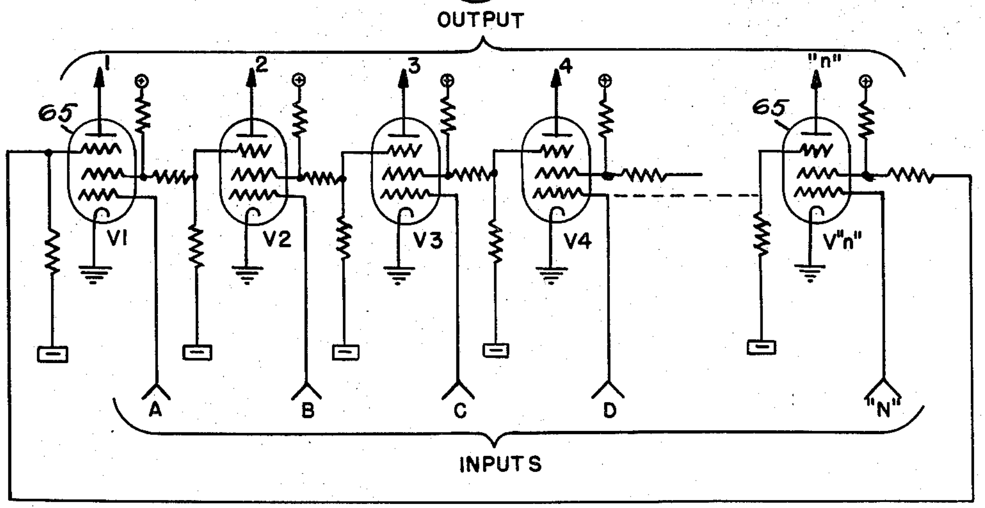
Fig. 4 is a circuit of a Discrminator which may be used in the system of Fig. 1.
Figure 6A:
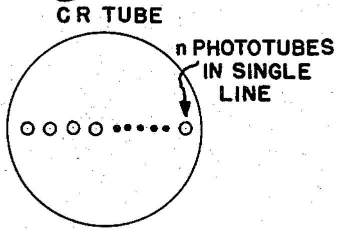
Fig. 6A is a diagrammatic view of a cathode ray tube with a single row of phototubes which may be used in the system of Fig. 1.

The outputs of the tubes 35, which may be ten in number as shown by Fig. 6A, are connected to a Discriminator Circuit 36 which is provided for the purposes of recognizing when at least one phototube has generated a signal, and for selectively producing a predetermined output configuration when more than one phototube has generated a signal. The Discriminator Circuit may be designed to resolve successive time intervals taking into consideration the phosphor decay-time characteristic of the cathode ray tube, and representative circuit details are shown by Fig. 4.

Figure 3A:
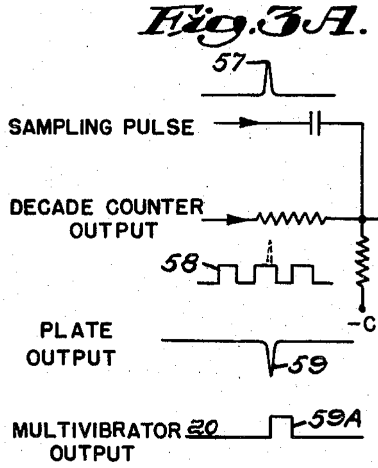
Fig. 3A is a circuit of a typical output sampler which may be used in the system of Fig. 1 in the Output Sampler and shows the incoming and outgoing signals.
Figure 3B:
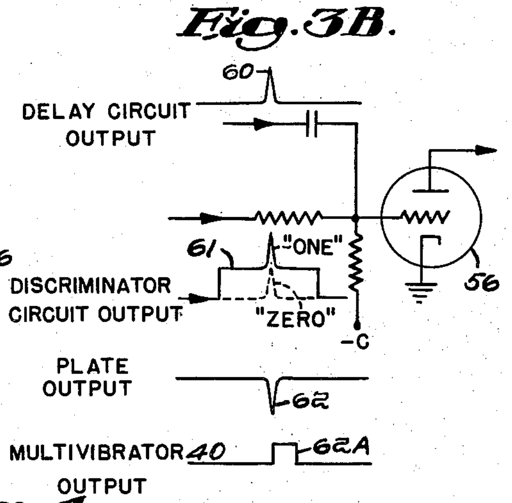
Fig. 3B is a circuit of a typical Output Sampler which may be used in the Least Significant Digit Sampler of Fig. 1, and shows the incoming and outgoing signals.

The outputs of the Discriminator Circuit are supplied into the Least Significant Digit Sampler 38 which contains coincidence circuits such as shown by Fig. 3B, one for each of the outputs, and to which the output of the Delay Circuit 46 is also supplied. The coincidence circuits provide output signals only when signal pulses from the Delay Circuit and the Discriminator Circuit arrive in coincidence. The outputs of the coincidence circuits are connected through Multivibrators 40 and Amplifiers 41 to a conventional Magnetic Tape Recorder 42.

In the embodiment of the invention illustrated by Fig. 1, there are ten phototubes, there are ten inputs into the Discriminator Circuit, ten outputs from the latter into the Least Significant Digit Sampler, ten outputs from the latter, ten Multivibrators 40 and ten Amplifiers 41 supplying ten outputs into the Magnetic Tape Recorder.

The Decade Counter 26 (five counters with four outputs each) has twenty outputs which are supplied into the Output Sampler 25 which would contain twenty coincidence circuits such as shown by Fig. 3A, and each of which delivers an output signal only when pulses from the Decade Counter and the Sampling Pulse Generator arrive in coincidence. The outputs are also twenty in number and are supplied through Multivibrators 43 and Amplifiers 44 into the Magnetic Tape Recorder, there being twenty Multivibrators 43 and twenty Amplifiers 44.

The number and arrangement of phototubes may be varied according to specific requirements. An enhancement of precision is obtained by increasing the number of phototubes. Another feature of this invention is that this may be accomplished without altering the basic counter.

Figure 7A:
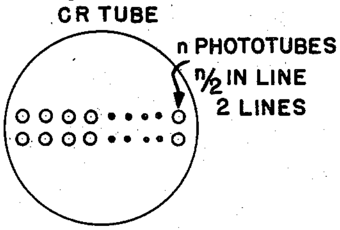
Fig. 7A is a diagrammatic view of a cathode ray tube having two rows of phototubes which may be used in the system of Fig. 1.
Figure 8A:
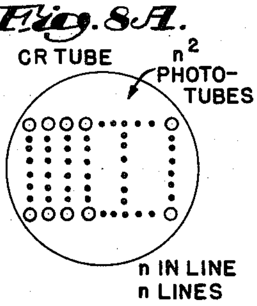
Fig. 8A is a diagrammatic view of a cathode ray tube having phototubes arranged in vertical and horizontal rows which may be used in the system of Fig. 1.
Figure 6B:
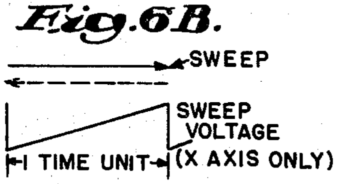
Fig. 6B is a chart showing the sweep and the sweep voltage of the cathode ray tube of Fig. 6A.
Figure 7B:
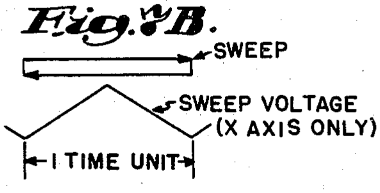
Fig. 7B is a chart showing the sweep and the sweep voltage of the cathode ray tube of Fig. 7A.
Figure 8B:
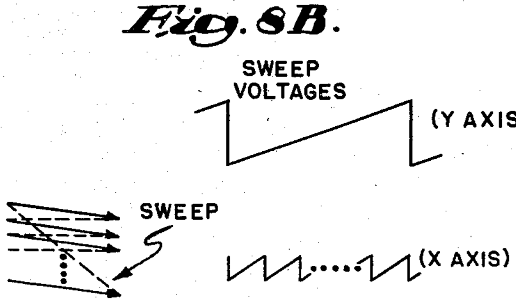
Fig. 8B is a chart showing the sweep and the sweep voltages of the cathode ray tube of Fig. 8A.

Figs. 6A, 7A, and 8A illustrate arrangements most amenable to rapid change in operation. In Fig. 6A, $n$ (10) phototubes are arranged in a single line and being swept in succession by conventional cathode ray tube technique with blanked return trace. By adjusting sweep (rate, duration, and position) the effective number of phototubes may be changed. In Fig. 7A, a variation of oscilloscope technique is illustrated, two rows of $n/2$ phototubes being scanned in a reciprocating scan, using vertical off-set to separate "halves" of a complete scan. Fig. 8A illustrates an extension of the arrangement of Fig. 7A to a form of raster scan as in television technique.

Figure 2:
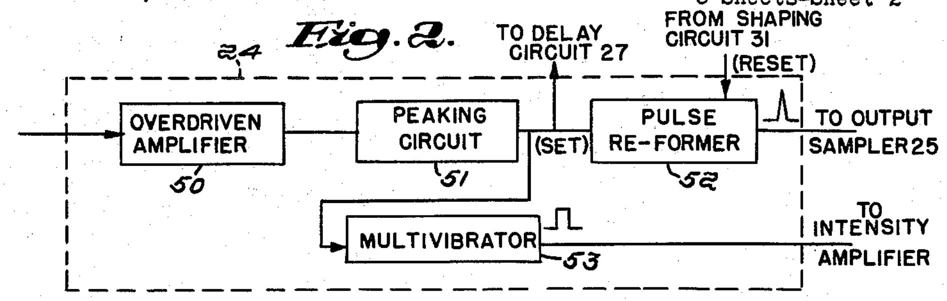
Fig. 2 is a block diagram of the components which may be used in the Sampling Pulse Generator of Fig. 1.

Fig. 2 illustrates a form of Sampling Pulse Generator that may be used. It consists of an overdriven amplifier 50, connected to a peaking circuit 51 which delivers a peaked pulse to the Delay Circuit 27 and, through a conventional Pulse Re-Former 52 such as an Eccles-Jordan Circuit, to the Output Sampler 25. The peaking circuit also delivers a pulse to a multivibrator 53 which supplies a square wave pulse to the Intensity Amplifier 28.

Fig. 3A illustrates one of the coincidence circuits that can be used in the Output Sampler 25 of Fig. 1. It consists of a triode 56 normally biased beyond cut-off, its plate being connected to the respective Multivibrator 43 following the Output Sampler. When used in the Output Sampler 25, when a sampling pulse 57 arrives at the control grid of the triode 56 in coincidence with an output pulse 58 from the Decade Counter, the tube conducts and delivers an output pulse 59 to the respective Multivibrator 43 which, in turn, delivers a square wave pulse 59A to the respective Amplifier 44.

Fig. 3B shows a similar coincidence circuit, and differs from Fig. 3A only in the showing of the incoming and outgoing pulses resulting from its use in the Least Significant Digit Sampler instead of in the Output Sampler of the Decade Counter. A pulse 60 from the Delay Circuit 27 arriving in coincidence with a respective pulse 61 from the Discriminator at the control grid of the triode 56 causes the latter to conduct and to deliver an output pulse 62 to the respective Multivibrator 40 which, in turn, delivers a square wave pulse 62A to the respective Amplifier 41.

Fig. 4 illustrates a circuit which may be used for the Discriminator 36. It consists of a series of $n$ pentodes, V1, V2, V3, V4, V5 . . . V$n$ arranged in a loop circuit, the screen grids of preceding tubes being connected to the suppressor grids of adjacent following tubes. Input signals A, B, C, D . . . N from respective phototubes are supplied to the control grids of the pentode tubes. Each input is driven by a signal that will either cause cut-off or cause full (screen) conduction—no partial conduction being permitted, i.e., the grid signal causes the screen section of the pentode to act as an on-off switch. Accordingly, occurrence (or non-occurrence) of screen conduction by any pentode causes the direct connected suppressor in the adjacent pentode to assume conditions prohibiting or admitting the possibility of conduction in the corresponding plate circuit, i.e., the suppressor signal causes the plate section of the pentode to act as an on-off switch which is in series with the on-off switch action of the screen section of the same pentode. The net effect approximates that of a set of two-circuit switches interconnected so that closing one switch opens an adjacent circuit at the same time it closes one of the two series contacts of its own circuit.

With the input lettering and output numbering shown by Fig. 4, an "on" condition of input A denies the possibility of conduction in output 2 and allows conduction in output 1 provided input "N" is not in an "on" condition also; B "on" denies conduction in output 3 and permits conduction in output 2 if A is off; C "on" denies conduction in output 4 and permits conduction in output 3 if B is off, etc. In the circuit shown by Fig. 4, "on" implies ground potential applied to a control grid. For example, if B is "on," the grid of V2 is at ground potential, its screen is conducting and,therefore, holding the suppressor of V3 beyond cut-off potential—and although V3 may have screen conduction if C is "on," V3 cannot have plate conduction—but nothing can be said as to plate conduction of V2 unless the condition of input A is known, since the suppressor of V2 is controlled by the screen of V1.

Each of the pentodes thus acts as a control on the next higher numbered pentode (and the highest numbered pentode acts as a control on the lowest numbered pentode). Then if the normal condition for all inputs is the "off" condition, i.e., control grids of all pentodes held beyond cut-off potential, there will normally be no screen or plate conduction in any pentode. Occurrence of a single "on" condition will result in both screen and plate conduction in the corresponding pentode. Occurrence of "on" condition on successively lettered inputs will result in screen conduction in all corresponding pentodes but plate conduction (and hence output) only in the lowest numbered corresponding pentode, giving due consideration to the fact that V$n$ is a lower number than V1 when consecutive lettered inputs include N and A.

In the usage shown in a Discriminator 36 and in similar usages, occurrence of more than one "on" condition is always as a set of adjacent or consecutively lettered inputs so that but a single output lead is energized (rendered conductive). Thus, as used in Fig. 1, a single output signal will be provided when adjacent phototubes are exposed to light caused by an intensified cathode ray tube sweep caused by sampling pulse.

For the lettering of leads shown by Fig. 4, the "lowest" numbered output will be energized. If the lead order is reversed, the "highest" numbered output would be energized. The choice of order allows choice of the start or the end of the sampling pulse as the effective reading.

*Operation of Fig. 1*

In the operation of Fig. 1, the Frequency Standard 30, the Decade Counter 26 and the Sweep Generator 33 are assumed to be operating continuously. The sweep of the cathode ray tube 29 would also operate continuously. When a projectile 20 passes thru the first loop 21, a voltage would be induced in the loop which would be amplified in its Amplifier 22 and supplied thru the Mixer 23 into the Sampling Pulse Generator 24. The latter would deliver a peaked pulse to the Output Sampler 25 which would produce outputs on selected ones at the twenty output leads in accordance with the pulses (from the Decade Counters) with which it is in coincidence. (The Pulse Re-Former 52, of Fig. 2, prevents sampling of the Decade Counter while it is in transition to the next count.)

Each of said outputs would be converted into a square wave pulse in its associated Multivibrator 43 which would be amplified in its associated Amplifier 44, and then recorded in the Magnetic Tape Recorder 42. The input signal is shown in line 1 of Fig. 5; the corresponding output of the Output Sampler 25 is shown in line 2 of Fig. 5, and the corresponding recorded signal is shown in line 10 of Fig. 5.

At the time when the Sampling Pulse Generator 24 receives a signal from the Mixer 23, it delivers a square wave pulse through the Intensity Amplifier 28 to the beam of the cahtode ray tube 29 causing the beam momentarily to be intensified. The one or more of the phototubes opposite the resulting intensified spot on the screen causes one or more pulses to be delivered to the Discriminator 36 which delivers a single output pulse to the respective output lead connected to the Least Significant Digit Sampler 38.

At the same time the Sampling Pulse Generator delivers a spiked pulse to the Output Sampler, it delivers a similar pulse to the Delay Circuit 27, which pulse is delayed in Delay Circuit 27 and supplied into the Least Significant Digit Sampler 38 where, when it arrives in coincidence with a respective output signal from the Discriminator 36, a respective output pulse is produced by the respective coincidence circuit and supplied through the respective lead to the respective Multivibrator 40, where it is converted to a square wave pulse which is then amplified by the respective Amplifier 41 and supplied into the Magnetic Tape Recorder 42.

The outputs of the phototubes responding to the light caused by the intensified sweep of the cathode ray tube will have been delayed behind the respective sampling pulse by an amount allowing for the phosphor response-time and decay-time of the cathode ray tube.

Figure 5:
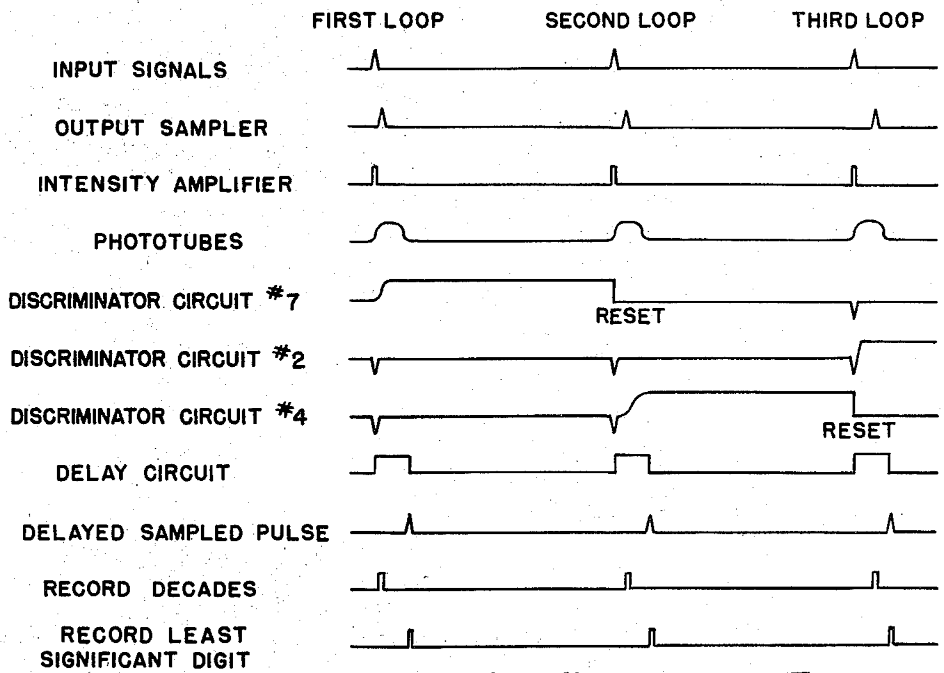
Fig. 5 is a chart showing voltage pulses at different points in the system of Fig. 1.

Lines 3 and 4 of Fig. 5 show the voltage pulses at the Intensity Amplifier 28 and at the activated phototubes respectively. Lines 5 and 8 of Fig. 5 show the corresponding pulses at the Discriminator and the Delay Circuit respectively. Lines 9 and 11 of Fig. 5 show the corresponding pulses at the output of the Delay Circuit and at the Magnetic Tape Recorder respectively.

When the projectile passes through each of the remaining loops 10, the action described in the foregoing is repeated. Fig. 5 shows the signals resulting from the passage of the projectile through the first three loops. The projectile may pass through the first loop at 00001.7 microseconds, at which time the Decade Counter would be at 00001.0 and the cathode ray tube beam would be opposite phototube #7 at the time of the pulse from the Sampling Pulse Generator. The sampling of the Decade Counter output would be performed at time 00002.0 and the sampling of the least significant digit would not occur until perhaps 00006.3 as a representative case—the longer delay to allow phototube response and discriminator circuit operation. However, since the Decade Counter would not advance from 00001 to 00002 until time 00002.5, the digits obtained by the output sampling would be 00001 and, since the phototube #7 was the first energized, the least significant digit would be .7. The signal from the Mixer 23 enters the Amplifier 50 (Fig. 2), is amplified, and its leading edge shaped by the Peaking Circuit 51, resulting in immediate output to Delay Circuit 27, to Multivibrator 53 and through the latter to Intensity Amplifier 28, and to the Pulse Re-Former 52 which is set at this time. These actions occur at 00001.7 microseconds.

At the next time ending at .0 (in this example 00002.0) a signal from the Frequency Standard Oscillator supplied through the Shaping Circuit 31, causes the Pulse Re-Former 52 to be reset, and results in an output pulse to the Sampler 25. At this time (00002.0 microseconds), the Decade Counter 26 will be stationary and can be sampled safely.

The advance of the Decade Counter 26 is delayed to occur at times ending in .5 so as to prevent the possibility of stages being in transition at the time of sampling.

Referring again to the example in which the output of the Pulse Re-Former 52 occurred at 00002.0, the Decade Counter 26 at that time would still be at 00001, and would remain at that count until the next advance pulse ending in .5 (for this example being 00002.5), at which time the Decade Counter would advance to count 00002.

Recalling that the Delay Circuit 27 was also actuated at time 00001.7, there will be an output from it at time 00001.7 plus 4.6 (delay in Delay Circuit 27) equals 0006.3. During the delay in the Delay Circuit, responses as received from the Phototubes 35 cause action in the Discriminator Circuit 36 resulting in changing output levels, but the final resting state of the Discriminator Circuit will have been reached by time 0006.3.

The Pulse Re-Former 52 can be set at any time from .0 through .9, and will be reset with a subsequent output only at the next time .0.

The Magnetic Tape Recorder 42 is a conventional digital recorder having twenty channels for recording signals from the Amplifiers 44. There are five digits: $10^1$, $10^2$, $10^3$, $10^4$ and $10^5$, each containing four channels 1, 2, 4 and 8. There are ten channels: $0_0$, $0_9$, $0_8$, $0_7$, $0_6$, $0_5$, $0_4$, $0_3$, $0_2$ and $0_1$ for receiving signals from the least significant digit amplifiers 41. The 00006.3 would be recorded as a 3 in the $0_3$ channel, and as a 2 and a 4 in the $10^1$ channel.

The projectile may pass through the second loop at time 00048.4 microseconds, at which time the cathode ray tube beam would be intensified and at time 00049.0 the Decade Counter output would be sampled. However, the least significant digit sampling would occur at approximately time 00053.0 (but would still record as 4 since the intensification of the cathode ray tube beam would cause increased light output opposite phototube #4) and, since the Decade Counter would read 00048 at time 00049.0, the output reading recorded would be 00048.4 as required. This would be recorded as a 4 in the $0_4$ channel, as an 8 in the $10^1$ channel, and as a 4 in the $10^2$ channel.

We claim:

1. In a timing system, a cathode ray tube having a screen, a plurality of phototubes arranged to be swept in succession by light from said screen produced by the beam of said cathode ray tube, an input signal source, means including means connected to said source and to said cathode ray tube for intensifying said beam when signals from said source occur, output circuits for said phototubes, and means including a discriminator circuit connected to said output circuits for providing a single output signal when one or more than one of said phototubes are actuated by a brightened spot on said screen caused by a signal from said source.

2. The invention claimed in claim 1 in which means is provided for using output signals from said discriminator circuit for indicating the times at which signals from said source occur.

3. The invention claimed in claim 1 in which a delay circuit is connected to said signal source for providing an output pulse delayed behind a corresponding signal from said source, in which means including a plurality of coincidence circuits are connected to said discriminator circuit and to said delay circuit for delivering output pulses when output pulses from said delay circuit and output signals from said discriminator circuit arrive in coincidence.

4. The invention claimed in claim 3 in which means is provided for using output pulses from said distriminator circuit for indicating the times at which signals from said source occur.

5. The invention claimed in claim 4 in which means including a constant frequency oscillator deflects said beam at a uniform rate.

6. In a timing system a cathode ray tube having a screen, a plurality of phototubes arranged to be swept in succession by light from said screen produced by the beam of said cathode ray tube, means including a constant frequency oscillator for deflecting said beam at a uniform rate across said screen, an input signal source, means including a sampling pulse generator connected to said source and to said cathode ray tube for causing said screen to brighten when signals from said source are applied to said generator, a plurality of coincidence circuits connected to said phototubes, a delay circuit connected to said generator and to said circuits, said generator delivering output pulses to said delay circuit when signals from said source are applied to said generator, said delay circuit providing correspoding pulses delayed behind said signals from said source, said coincidence circuits providing output signals when pulses from said phototubes and corresponding pulses from said delay circuit arrive at corresponding of said coincidence circuits in coincidence.

7. The invention claimed in claim 6 in which means including a distriminator circuit is provided between said phototubes and said coincidence circuits for providing a single output signal to said coincidence circuits when one or more than one of said phototubes are activated by a brightened spot on said screen caused by a signal from said source.

8. The invention claimed in claim 7 in which means is provided for using output pulses from said coincidence circuits for indicating the times at which signals from said source occur.

9. In a timing system, a cathode ray tube having a screen, a plurality of phototubes arranged to be swept in succession by the light from said screen produced by the beam of said cathode ray tube, a constant frequency oscillator, means including said oscillator for deflecting said beam at a uniform rate across said screen, a decade counter connected to said oscillator, a first plurality of coincidence circuits connected to said counter, an input signal source, a sampling pulse generator connected to said source and to said circuits, said generator delivering pulses to said circuits when signals from said source occur, a recorder, said circuits delivering output signals to said recorder when pulses from said generator and from said oscillator arrive at corresponding of said coincidence circuits in coincidence, means including said sampling pulse generator for brightening said screen when signals from said source occur, means including a discriminator circuit connected to said phototubes for delivering a single output pulse when one or more of said phototubes are activated by light from said screen as a result of a single signal from said source, a second plurality of coincidence circuits connected to said discriminator circuit and to said recorder, a delay circuit connected to said generator and said second plurality of coincidence circuits, said last mentioned circuits delivering output signals to said recorder when pulses from said delay circuit and corresponding output pulses from said discriminator arrive at corresponding of said last mentioned coincidence circuits in coincidence.

10. A timing system comprising a plurality of spaced-apart signal pick-up means in which signals are generated by the passage of a projectile, amplifiers connected to said pick-up means, a mixer connected to said amplifiers, a cathode ray tube having a screen, a plurality of phototubes arranged to be swept in succession by light from said screen produced by the beam of said cathode ray tube, means for deflecting said beam at a uniform rate across said screen, means including means connected to said mixer and to said cathode ray tube for intensifying said beam when a signal from said mixer occurs, and means including means electrically connected to said phototubes, activated by phototubes opposite intensified spots on said screen for indicating the times at which said projectile passes said pick-up means.

11. A timing system as claimed in claim 10 in which means including a discriminator is connected between said phototubes and said activated means for providing a single output pulse to said activated means when one or more than one of said phototubes are activated by a brightened spot on said screen caused by a signal from said mixer.

12. A timing system as claimed in claim 11 in which a plurality of coincidence circuits are connected between said discriminator circuit and said activated means, and in which a delay circuit is connected to said mixer and to said coincidence circuits, said coincidence circuits delivering output signals to said activated means when pulses from said delay circuit arrive in coincidence at corresponding ones of said coincidence circuits with corresponding output pulses from said discriminator circuit.

13. A timing system as claimed in claim 9 in which the signal source is a mixer connected to a plurality of spaced-apart pick-up means in which signal voltages are generated by a passing projectile.

14. An electronic signal observation system comprising a cathode ray tube having a screen, deflection means for moving the cathode beam of said tube across said screen, a plurality of spaced-apart phototubes exposed at different times to light from said screen at different positions of said beam, a source of input signals to be observed, a source of timing signals, means including means connected to one of said sources for actuating said deflection means with signals from said one of said sources, means including means connected to the other of said sources for intensifying said beam, a delay circuit connected to said other source for providing an output signal delayed beyond a corresponding signal from said other source, and a plurality of coincidence circuits connected to said phototubes and to said delay circuit for delivering output pulses when output signals from said circuit and from corresponding phototubes arrive in coincidence at corresponding ones of said coincidence circuits.

References Cited in the file of this patent

UNITED STATES PATENTS

| | | |
|---|---|---|
| 2,422,698 | Miller | June 24, 1947 |
| 2,565,486 | Feinstein | Aug. 28, 1951 |
| 2,595,701 | Potter | May 6, 1952 |
| 2,665,410 | Burbeck | Jan. 5, 1954 |
| 2,678,254 | Schenck | May 11, 1954 |
| 2,733,358 | Carapellotti | Jan. 31, 1956 |